July 26, 1932. F. E. BADGER 1,868,789
DEVICE FOR LUBRICATING VEHICLE LEAF SPRINGS AND SHOCK ABSORBER THEREFOR
Filed Oct. 22, 1928

INVENTOR
Floyd E. Badger
BY Whittemore Hulbert
Whittemore & Belknap
ATTORNEYS

Patented July 26, 1932

1,868,789

UNITED STATES PATENT OFFICE

FLOYD E. BADGER, OF DETROIT, MICHIGAN, ASSIGNOR TO DETROIT STEEL PRODUCTS COMPANY, OF DETROIT, MICHIGAN, A CORPORATION OF MICHIGAN

DEVICE FOR LUBRICATING VEHICLE LEAF SPRINGS AND SHOCK ABSORBER THEREFOR

Application filed October 22, 1928. Serial No. 314,162.

The invention relates to vehicle leaf springs and refers more particularly to devices for lubricating springs of this character and also shock absorbers for these springs. One of the objects of the invention is to provide a simple form of lubricating device which may be readily secured to the spring. Another object is to so construct the device that it also lubricates the shock absorber. A further object is to so construct the device that it forms a cover for the shock absorber. With these as well as other objects in view, the invention resides in the novel features of construction and combinations and arrangements of parts as more fully hereinafter set forth.

Figure 1:
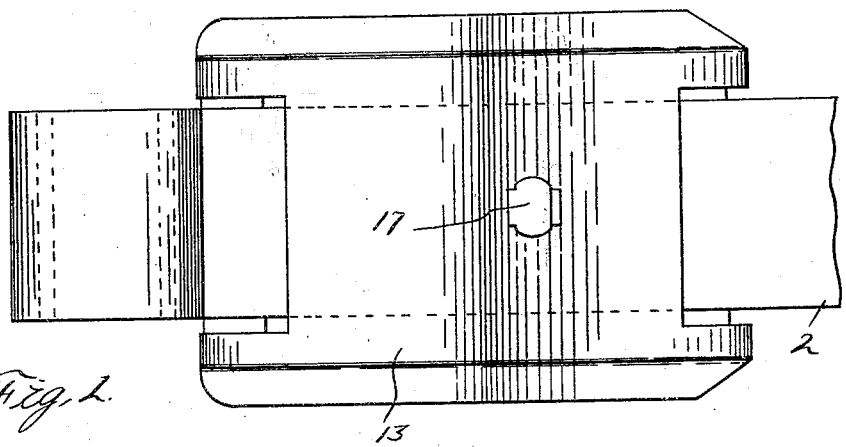
Figure 1 is a plan view of a portion of a vehicle leaf spring and a shock absorber having applied thereto a lubricating device embodying the invention.
Figure 2:
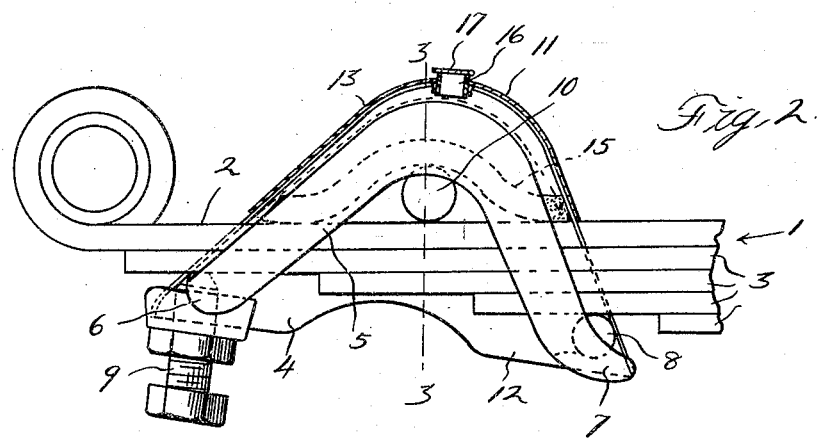
Figure 2 is a sectional elevation thereof.
Figure 3:
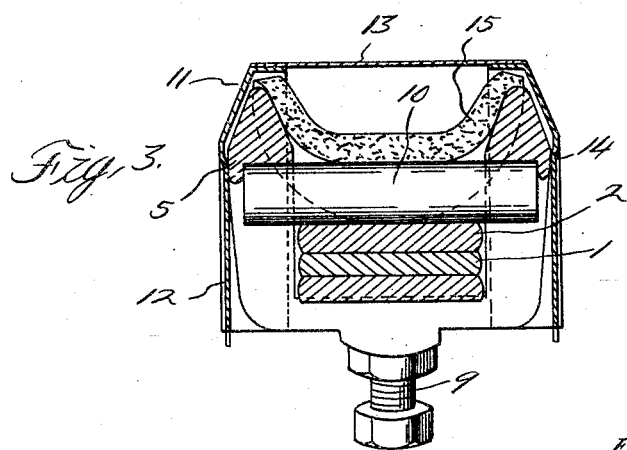
Figure 3 is a cross section on the line 3—3 of Figure 2.

The invention is designed particularly for use with motor vehicle leaf springs and as shown 1 is such a spring having the main leaf spring 2 on its upper or concave side and the complemental leaves 3 on its lower or convex side. The shock absorber for the spring is located near an end thereof and has the frame 4 which is formed of the V-shaped arms 5 at the edges of the spring and the integral cross bars 6 and 7 connecting the ends of the arms and located below the spring. The shock absorber has the contact bearings 8 and 9 at the ends of the arms for engaging the lower side of the spring, the contact bearing 8 being in the nature of a roll mounted upon the cross bar 6 and engageable with a complemental leaf 3 and the contact bearing 9 being in the nature of a set screw threadedly engaging the cross bar 7 and abutting another complemental leaf 3. The shock absorber further has the contact bearing 10, in the nature of a roll, at the apices of the arms and engaging the upper side of the spring and more particularly the main leaf 2. 11 is a cover for the shock absorber comprising the sheet metal triangular side plates 12 and the web 13, the side plates being at the outer sides of the arms 5 and the web extending over these arms and terminating above the main spring leaf. This cover is attachable to the shock absorber and its side plates 12 are embossed inwardly at 14 to tightly frictionally engage the arms 5 near their apices. 15 is a felt pad within the cover 11 between the arms 5 and above and preferably contacting with the main leaf 2 and the contact bearing 10. This pad is preferably soaked with lubricant and to provide for additional lubricant the web 13 of the cover is provided with the filler neck 16 normally closed by the movable top 17. With this arrangement lubricant spreads upon the main spring leaf and between this leaf and the upper-roll contact bearing, lubricant passes downwardly along the edges of the spring and enters between its leaves as well as between the complemental leaf and the lower roll contact bearing.

It will thus be seen that I have provided a simple lubricating device which may be readily attached to a spring by being forced upon the frame of the shock absorber to be carried thereby. It will also be seen that this device serves to lubricate both the shock absorber and the spring leaves.

What I claim as my invention is:

1. The combination with a vehicle leaf spring and a shock absorber upon said spring, of means for lubricating the spring leaves including a lubricant receiving member and a housing and securing member for said lubricant receiving member engaging said shock absorber.

2. The combination with a vehicle leaf spring and a shock absorber therefor having a frame and contact bearings at longitudinally spaced points of said spring for engaging the upper and lower sides of said spring, of a cover attachable to said shock absorber for housing the same, and a lubricant receiving pad within said cover above said spring and contact bearings.

3. The combination with a vehicle leaf spring and a shock absorber therefor having a frame comprising V-shaped arms at the edges of said spring, contact bearings at the ends of said arms for engaging the lower side of said spring, a contact bearing at the apices of said arms for engaging the upper side of said spring, a cover for said shock absorber mounted upon said arms, and a lubricant receiving pad within said cover and above said spring and last mentioned contact bearing.

4. The combination with a vehicle leaf spring and a shock absorber therefor having a frame comprising V-shaped arms at the edges of said spring, contact bearings at the ends of said arms for engaging the lower side of said spring, and a contact bearing at the apices of said arms for engaging the upper side of said spring, of a cover attachable to said shock absorber comprising side plates and a web connecting said side plates and located above said spring, and a fibrous lubricant receiving pad within said cover between said arms and above said spring.

5. The combination with a vehicle leaf spring and a shock absorber therefor having a frame and contact bearings for engaging the upper and lower sides of said spring at longitudinally spaced points, of means for lubricating said shock absorber including a cover attachable to said frame, and lubricant receiving means within said cover above said contact bearings.

6. The combination with a vehicle leaf spring and a shock absorber therefor having a frame and contact bearings at longitudinally spaced points of said spring for engaging the upper and lower sides of said spring, of a cover attachable to said shock absorber comprising side plates engaging said frame and a web member connecting said side plates and located above said spring.

7. The combination with a vehicle leaf spring and a shock absorber therefor having a frame and contact bearings at longitudinally spaced points of said spring for engaging the upper and lower sides of said spring, of a cover attachable to said shock absorber comprising side plates engaging said frame and a web member connecting said side plates and located above said spring, and a lubricant receiving member interposed between the web portion of said cover and said spring.

In testimony whereof I affix my signature.

FLOYD E. BADGER.